(12) United States Patent
Hellevik et al.

(10) Patent No.: US 8,050,965 B2
(45) Date of Patent: Nov. 1, 2011

(54) USING A DIRECTED GRAPH AS AN ADVERTISING SYSTEM TAXONOMY

(75) Inventors: Ole Christian Hellevik, Bellevue, WA (US); Ashis K. Roy, Redmond, WA (US); Phani K. Vaddadi, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 863 days.

(21) Appl. No.: 11/956,934

(22) Filed: Dec. 14, 2007

(65) Prior Publication Data
US 2009/0157444 A1 Jun. 18, 2009

(51) Int. Cl.
*G06Q 30/00* (2006.01)
(52) U.S. Cl. .................. 705/14; 705/14.43; 705/14.5
(58) Field of Classification Search .......... 705/14, 705/14.43, 14.5
See application file for complete search history.

(56) References Cited

U.S. PATENT DOCUMENTS

| | | | |
|---|---|---|---|
| 5,768,578 A * | 6/1998 | Kirk et al. .............................. | 1/1 |
| 6,360,227 B1 | 3/2002 | Aggarwal et al. | |
| 6,954,749 B2 | 10/2005 | Greenblatt | |
| 7,127,455 B2 | 10/2006 | Carson | |
| 7,162,480 B2 | 1/2007 | Vishik | |
| 7,203,701 B1 | 4/2007 | Packebush | |
| 2002/0156791 A1 | 10/2002 | Nesamoney | |
| 2003/0174165 A1 | 9/2003 | Barney | |
| 2005/0080781 A1 | 4/2005 | Ryan | |
| 2006/0242013 A1 | 10/2006 | Agarwal | |
| 2006/0282339 A1 | 12/2006 | Musgrove | |
| 2007/0143296 A1 | 6/2007 | Casion | |
| 2008/0018730 A1 * | 1/2008 | Roth ........................... | 348/14.02 |

OTHER PUBLICATIONS

Wang, Chiou-Pirng, et al., Analyzing the Taxonomy of Internet Business Models Using Graphs, 2003, http://www.firstmonday.org/issues/issue8_6/wang/index.html.
Gao, Jerry, PhD., et al., Online Advertising—Taxonomy and Engineering Perspectives, 2002, http://www.engr.sjsu.edu/gaojerry/report/OnlineAdvertising%20.pdf.
Lee, Bongshin, et al., Task Taxonomy for Graph Visualization, 2006 http://www.lri.fr/~fekete/ps/TaskTaxo-Graphs.pdf.

* cited by examiner

*Primary Examiner* — Lindsay M. Maguire
(74) *Attorney, Agent, or Firm* — Shook Hardy & Bacon (57) ABSTRACT

Embodiments relate to generating and using a directed graph as an advertising network taxonomy. Individual delivery locations provided by publishers for presenting advertisements are identified. A directed graph is generated that includes specific advertising opportunities that each correspond with an individual delivery location. The directed graph also includes multiple general advertising opportunities that correspond with aggregations of delivery locations. Multiple aggregations may each include all or part of the same set of delivery locations. Advertisers may then use the directed graph to purchase advertising opportunities, and advertisements may be served to delivery locations based on the advertiser selections.

9 Claims, 6 Drawing Sheets

USING A DIRECTED GRAPH AS AN ADVERTISING SYSTEM TAXONOMY

BACKGROUND

Electronic advertising has become a significant aspect of computing environments, as it presents a powerful way for advertisers to market their products and services. Using electronic advertising, advertisers may be more likely to have their advertisements delivered to their target audience as compared with traditional media advertising, such as newspapers, magazines, and radio. There are a variety of electronic advertisings systems that may deliver advertisements for presentation with some primary content. For instance, advertisements may be presented within web pages, video games, advertisement-based software applications, and television programming (e.g., using a set-top box), to name a few.

Traditionally, electronic advertising opportunities are separated according to where advertisements can be delivered. More particularly, advertisers may select to purchase the opportunity to have their advertisements presented at either a specific location or a specific set of locations. By requiring advertisers to separately purchase advertising space according to delivery locations and predictions, the advertiser is forced to make more decisions by entering and managing more individual order line items. Additionally, publishers that provide advertising locations are disadvantaged because changes in traffic between delivery locations ordered in separate line items can reduce the overall likelihood of an order being met.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to using a directed graph as an advertising system taxonomy for serving advertisements. One or more publishers may provide a number of different delivery locations at which advertisements may be presented. The delivery locations are identified, and a directed graph is generated based on the delivery locations. The directed graph includes nodes that correspond with individual delivery locations as well as nodes that correspond with aggregations of delivery locations. In various embodiments, a directed graph may include varying levels of aggregations. Accordingly, the directed graph includes both specific advertising opportunities (e.g., each specific delivery location) and general advertising opportunities (e.g., each aggregation of multiple specific delivery locations). In embodiments, multiple aggregations may contain all or part of the same set of delivery locations. In other words, any given delivery location may be included within multiple different aggregations. In some embodiments, the directed graph may also include multiple, independent views by incorporating multiple edges between nodes.

In accordance with embodiments, a directed graph may be provided to an advertiser. The advertiser may review the directed graph and select one or more advertising opportunities. Based on the selections, the advertiser's advertisements may be served to one or more delivery locations associated with the selected advertising opportunities.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are directed to allowing multiple delivery locations for serving advertisements to be aggregated in a directed graph for advertising purposes. For instance, by allowing advertising opportunities to be aggregated in a directed graph, order items from advertisers may be entered against aggregates, allowing requests against any constituent delivery location to contribute to the overall goal for the order. Additionally, by aggregating delivery locations in a directed graph, embodiments allow for multiple aggregations to contain all or a part of the same set of delivery locations, thereby allowing for a higher degree of flexibility of aggregations that better meet customer expectations and needs. In some embodiments, a directed graph may be provided with multiple, independent views of the same advertising opportunities within the directed graph. The views may be tied to users, functional areas, or content areas, for instance, to allow users to access the most appropriate view for a given need. Accordingly, organizing the advertising system taxonomy as a directed graph with multiple, independent views allows for the sale of sets of advertising opportunities that can be defined in manners logical to advertisers and other parties that use the advertising system.

Accordingly, in one aspect, an embodiment of the present invention is directed to method for generating a directed graph as an advertising system taxonomy. The method includes identifying a number of specific advertising opportunities from one or more publishers. Each specific advertising opportunity comprises a specific location for serving an advertisement. Each specific location is defined by an environment for serving an advertisement and an advertisement product definition. The method also includes determining a number of general advertising opportunities. Each general advertising opportunity comprises an aggregate of one or more specific advertising opportunities, and at least two general advertising opportunities each include a common specific advertising opportunity. The method further includes generating a directed graph based on the specific advertising opportunities and the general advertising opportunities. The directed graph includes a number of terminal nodes having no descendent nodes, a number of internal nodes having descendant nodes, and a number of advertisement product definitions associated with the terminal nodes and the internal nodes. Each specific advertising opportunity is represented in the directed graph by a unique combination of a terminal node and an associated advertisement product definition. Each general advertising opportunity is represented in the directed graph by a unique combination of an internal node and an associated advertisement product definition. The method still further includes storing the directed graph.

In another embodiment, an aspect of the invention is directed toward one or more computer-storage media embodying computer-useable instructions for performing a method for using a directed graph as an advertising system taxonomy. The method includes providing the directed graph to an advertiser. The directed graph includes a number of nodes including a number of terminal nodes that do not have descendant nodes and a number of internal nodes that have one or more descendant nodes. One or more advertisement product definitions that each represent a type of advertisement are associated with each node. A combination of a terminal node and an associated advertisement product definition represents a specific advertising opportunity corresponding with a specific location for serving an advertisement. A combination of an internal node and an associated advertisement product definition represents a general advertising opportunity corresponding with one or more specific advertising opportunities from one or more terminal nodes associated with the internal node. The method also includes receiving an advertiser selection of at least one of a specific advertising opportunity and a general advertising opportunity from the directed graph. The method further includes facilitating the delivery of an advertisement of the advertiser to at least one specific location associated with the at least one of a specific advertising opportunity and a general advertising opportunity.

A further embodiment of the invention is directed to one or more computer-storage media embodying computer-useable instructions for performing a method. The method includes generating a directed graph representing a number of specific advertising opportunities and a number of general advertising opportunities. Each specific advertising opportunity corresponds with a unique delivery location for serving an advertisement. Each general advertising opportunity corresponds with at least a subset of the specific advertising opportunities, and at least two general advertising opportunities each include a common specific advertising opportunity. The method also includes providing the directed graph to an advertiser. The method further includes receiving an advertiser selection of at least one of a specific advertising opportunity and a general advertising opportunity. The method also includes receiving at least one advertisement for the advertiser. The method still further includes facilitating the delivery of the advertisement to at least one delivery location based on the advertiser selection.

Figure 1:
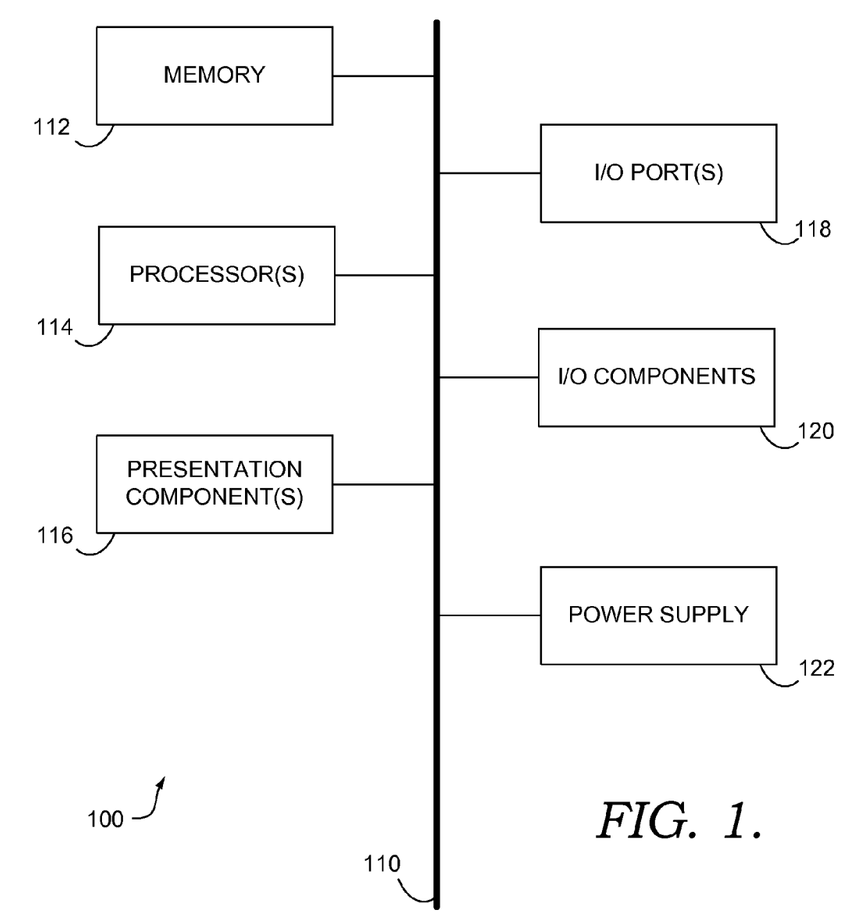
FIG. 1 is a block diagram of an exemplary computing environment suitable for use in implementing the present invention.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
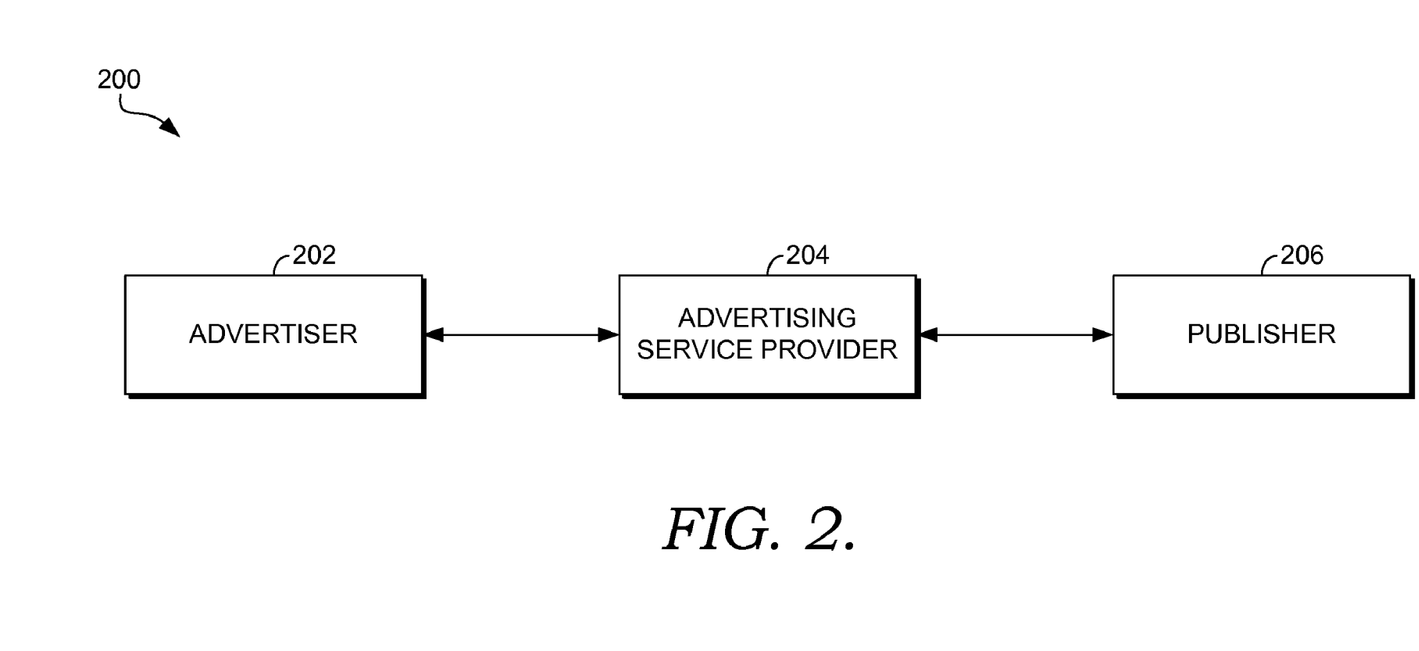
FIG. 2 is a block diagram illustrating an advertising system for serving advertisements from advertisers to environments provided by publishers in accordance with an embodiment of the present invention.

As previously mentioned, embodiments of the present invention relate to generating a directed graph as an advertising system taxonomy and employing the directed graph to facilitate the delivery of advertisements in an advertising system. Referring to FIG. 2, an exemplary advertising system 200 is presented in accordance with an embodiment of the present invention. As shown in FIG. 2, the advertising system 200 includes an advertiser 202, an advertising service provider 204, and a publisher 206. Although only a single advertiser 202 and publisher 206 are shown in FIG. 2, in operation, the advertising system 200 may include multiple advertisers and publishers. Additionally, although the advertising service provider 204 and the publisher 206 are shown as separate entities, in some embodiments, a single entity may serve to provide functions of both the publisher 206 and the advertising service provider 204.

Publishers, such as the publisher 206, may generally provide an environment in which advertisements from advertisers, such as the advertiser 202, may be presented. Non-limiting examples of environments that may be provided by publishers for presenting advertisements include web pages, video games, ad-based software, and television programming. For instance, the publisher 206 may maintain a web site having a number of web pages that include space for presenting advertisements within the web pages.

Each environment provided by a publisher, such as the publisher 206, may support advertisements of one or more given advertisement product definitions. As used herein, an advertisement product definition refers to a type of advertisement and/or specific terms defining an advertisement. For instance, an advertisement product definition may specify the actual size or sizes in pixels and the type of media (e.g., jpg, text, flash, etc.) supported. As another example, advertisement production definitions may include graphical advertisements, textual advertisements, video advertisements, audio advertisements, and any combination thereof. In the context of web pages, common advertisement product definitions include banner advertisements, button advertisements, and skyscraper advertisements.

Environments provided by publishers, such as the publisher 206, in association with the advertisement product definitions available for each environment present advertising opportunities. In other words, each environment and advertisement product definition for that environment present an opportunity for an advertisement from an advertiser to be presented to a user. Accordingly, each advertising opportunity represents a specific location for delivering an advertisement. For instance, suppose the publisher 206 maintains a web site that includes a variety of web pages that each include space for presenting banner advertisements. Each web page provides an opportunity for a banner advertisement from an advertiser to be presented.

In accordance with embodiments of the present invention, a directed graph is used to organize advertising opportunities provided by one or more publishers, such as the publisher 206. As will be described in further detail below, in one aspect, the directed graph provides specific advertising opportunities, such as the opportunity to provide an advertisement of a given advertisement product definition within a specific environment (e.g., a specific web page). The directed graph also provides general advertising opportunities, which represent aggregations of specific advertising opportunities. In various embodiments of the invention, multiple general advertising opportunities within a directed graph may contain all or part of the same set of specific advertising opportunities.

Directed graphs in accordance with embodiments of the present invention may be provided to advertisers. For instance, a directed graph associated with the publisher 206 may be provided to the advertiser 202. The advertiser 202 may then purchase one or more advertising opportunities presented by the directed graphs. By purchasing an advertising opportunity, advertisements from the advertiser 202 may be served to the locations associated with the purchased advertising opportunities. For instance, if the advertiser 202 purchases a specific advertising opportunity, an advertisement may be served to the specific delivery location associated with that specific advertising opportunity. If the advertiser 202 purchases a general advertising opportunity, an advertisement may be served to any or all of the delivery locations associated with the purchased general advertising opportunity.

The advertiser 202 may "purchase" an advertising opportunity in a number of different manners in various embodiments of the present invention. For instance, in some embodiments, "purchasing" an advertising opportunity may include the advertisement being served to the corresponding delivery locations in exchange for the advertising paying a given purchase price. In other embodiments, "purchasing" an advertising opportunity may include the advertiser agreeing to pay an amount on a pay-per-performance basis, such as a pay-per-impression, pay-per-click, or pay-per-conversion basis, for instance, as is known in the art. Additionally, in some embodiments, multiple advertisers may bid on advertising opportunities and advertisements are served to delivery locations based on corresponding bids and, in some cases, other monetization considerations. Any and all such variations are contemplated to be within the scope of embodiments of the present invention.

The advertising service provider 204 is an entity that facilitates the sale of advertising opportunities from publishers, such as the publisher 206, to advertisers, such as the advertiser 202. Based on the sales of advertising opportunities, the advertising service provider 204 may facilitate the delivery of advertisements to specific delivery locations. As noted previously, in some embodiments a single entity may function as both the publisher 206 and the advertising service provider 204. The advertising service provider 204 may include a sales team, service team, tools, advertising platform, and databases.

In embodiments, the advertising system provider 204 may maintain one or more advertising servers or other computing devices to facilitate coordination of advertising opportunities and the delivery of advertisements. The advertising servers may facilitate the creation, storage, and maintenance of directed graphs for publishers in accordance with embodiments of the present invention. Additionally, the advertising servers may facilitate providing directed graphs to advertisers and receiving advertiser selections or purchases of advertising opportunities. The advertising servers may also facilitate the delivery of advertisements for advertisers to delivery locations provided by publishers. Further, the advertising servers may track information, such as advertising opportunity purchases, impressions, click-throughs, and conversions, for instance, and facilitate analysis, such as revenue recognition.

Figure 3:
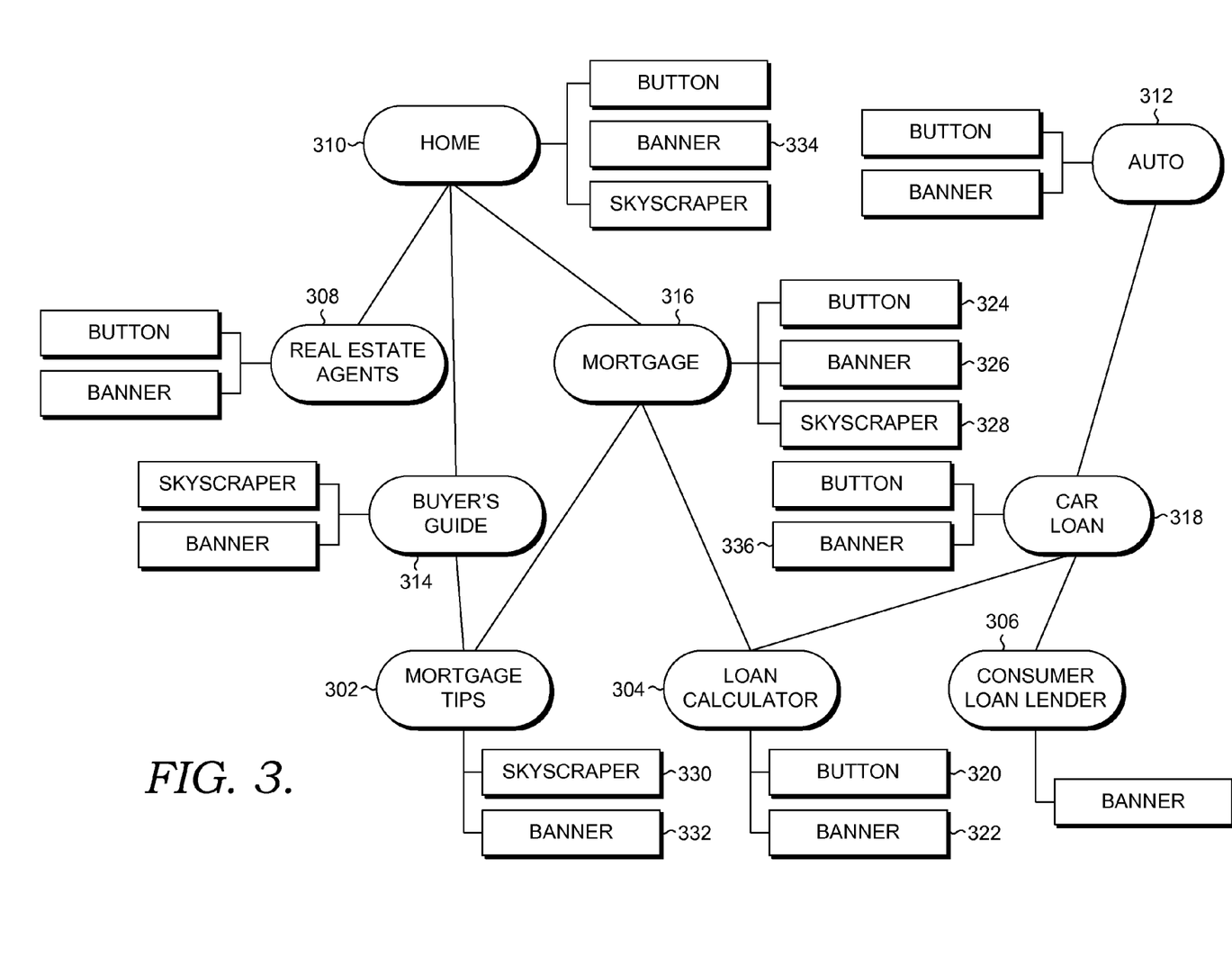
FIG. 3 is a exemplary directed graph for use as an advertising system taxonomy in accordance with an embodiment of the present invention.
Figure 4:
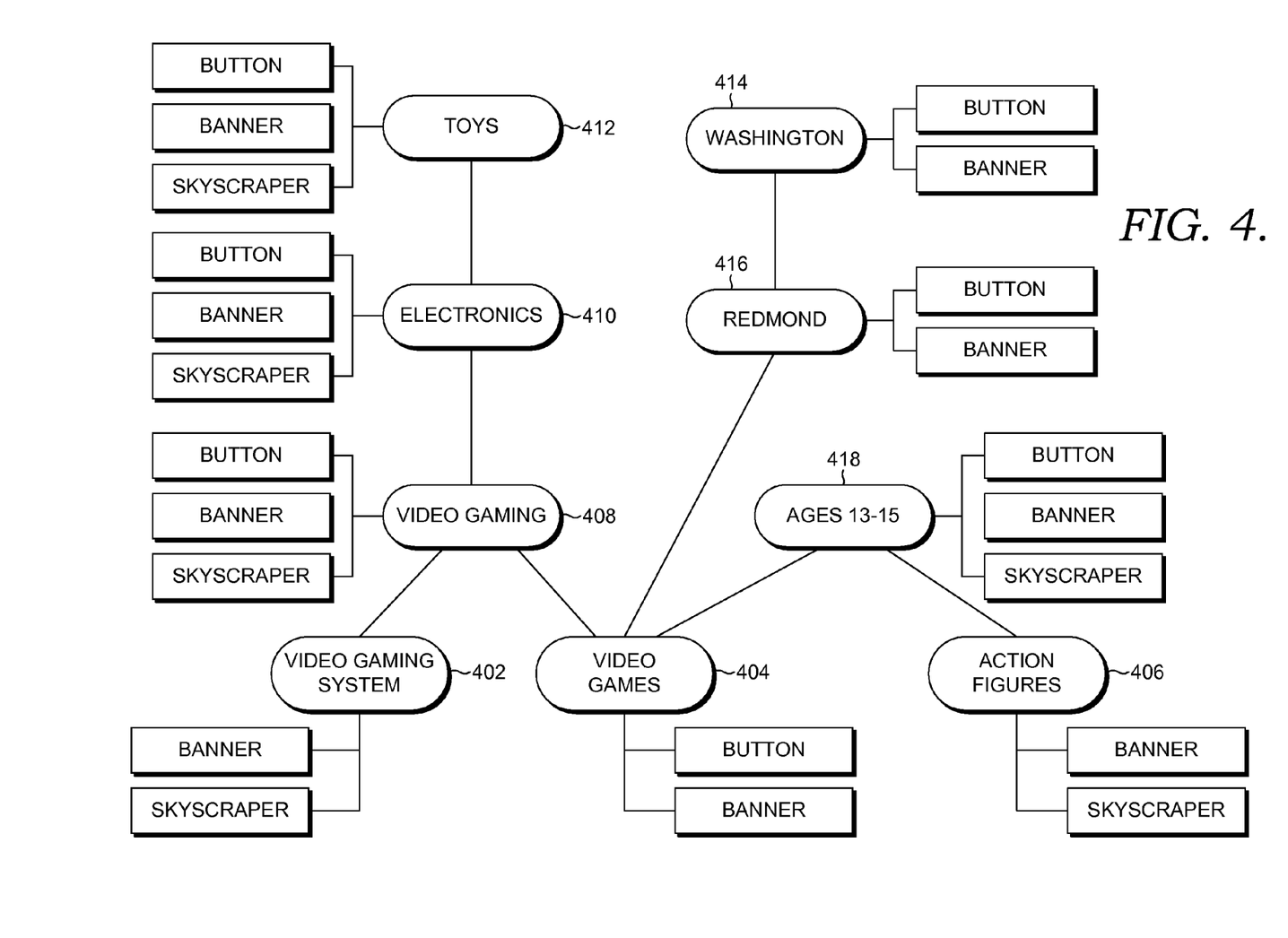
FIG. 4 is an exemplary directed graph in which multiple types of characterizations are used for nodes within the directed graph in accordance with an embodiment of the present invention.
Figure 5:
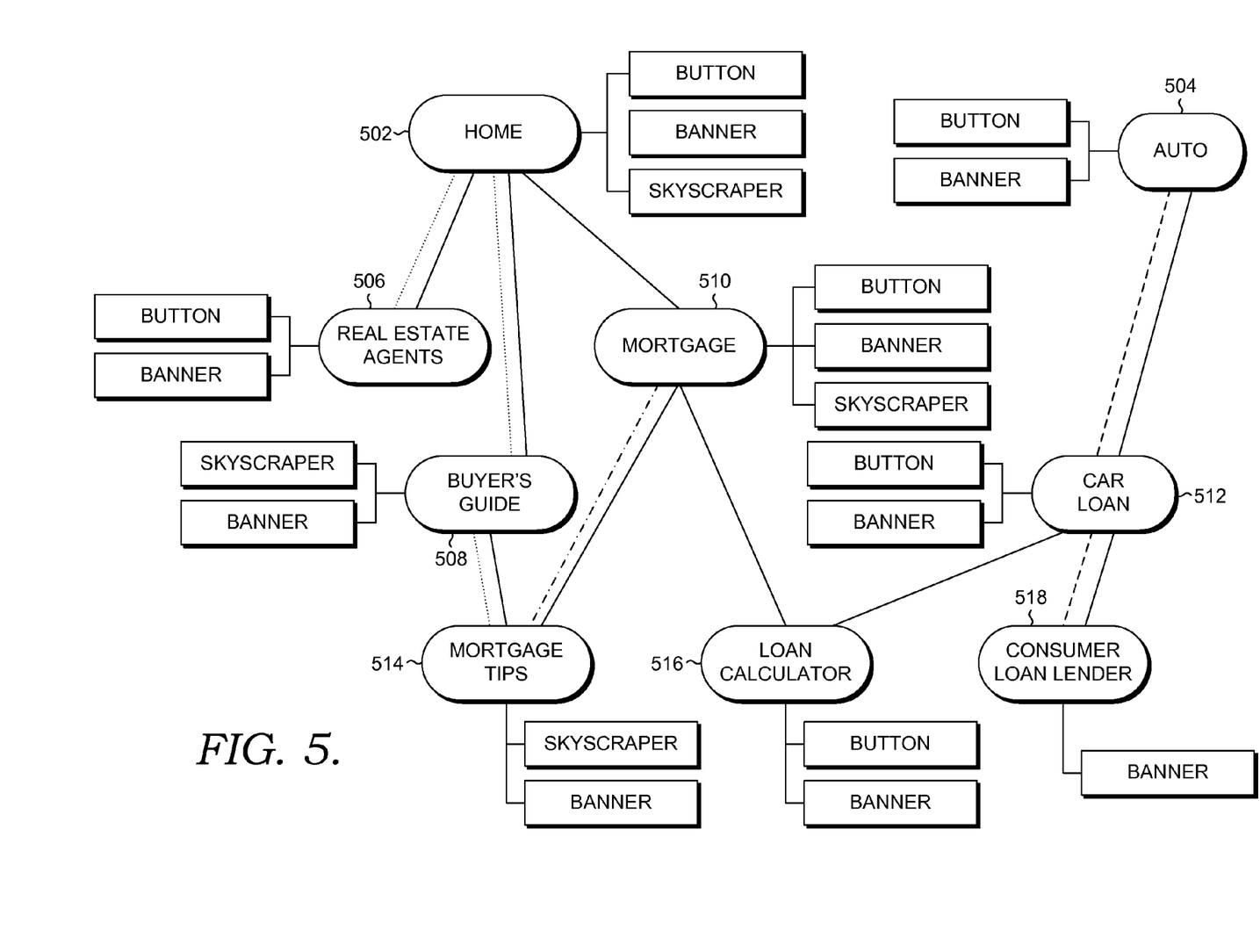
FIG. 5 is an exemplary directed graph having multiple views by providing multiple sets of edges between nodes in accordance with an embodiment of the present invention.

Embodiments of the present invention may be described with reference to FIGS. 3-5, which include exemplary directed graphs that may be employed for advertising purposes. It will be understood and appreciated by those of ordinary skill in the art that the directed graphs of FIGS. 3-5 are provided by way of example only and are not intended to limit the scope of the present invention in any way. Also, the directed graphs shown in FIGS. 3-5 are simplified for illustrative purposes. In practice, the directed graphs may be much more complex, incorporating a wide number of nodes.

Referring initially to FIG. 3, a directed graph is illustrated in accordance with one embodiment of the present invention. The directed graph includes nodes, which are represented as ovals, and associated advertisement product definitions, which are represented as rectangles. As will be described in further detail below, nodes represent the environment that surrounds the place where an advertisement can be displayed, and advertisement product definitions represent the types of advertisements that may be served within the associated environment. Vertical distance between nodes is used to describe the directionality of the graph.

Nodes are explicitly organized in a directed graph, while advertisement product definitions are only implicitly organized. The graph of nodes is directed in order to avoid circular relationships where a node can be its own ancestor or descendent. Additionally, a graph is used rather than a simple tree so that multiple aggregations can contain a subset of the same nodes (as will be described in further detail below).

Nodes and advertisement product definitions are also categorized as terminal and internal. Terminal nodes are those that do not have descendent nodes. For instance, in the directed graph of FIG. 3, nodes 302, 304, 306, and 308 are terminal nodes. Internal nodes are those that have one or more descendent nodes. For instance, in the directed graph of FIG. 3, nodes 310, 312, 314, 316, and 318 are internal nodes. Terminal advertisement product definitions are associated with terminal nodes, and internal advertisement product definitions are associated with internal nodes.

A terminal node corresponds with a specific environment at which an advertisement may be served. The present example of FIG. 3 illustrates a directed graph in which the terminal nodes 302, 304, 306, 308 correspond with web pages. In other words, the environment that surrounds the place where an advertisement may be displayed in the directed graph of FIG. 3 are web pages. For instance, the real estate agents terminal node 308 corresponds with a web page associated with real estate agents; the mortgage tips terminal node 302 corresponds with a web page for mortgage tips; the loan calculator terminal node 304 corresponds with a web page for a loan calculator; and the consumer loan lenders terminal node 306 corresponds with a web page for consumer loan lenders. Although the embodiment illustrated in FIG. 3 illustrates a directed graph associated with web pages, in various embodiments of the invention however, the environment may be, for instance, television programming, a video game, or an ad-based software program.

A terminal advertisement product definition represents a type of advertisement that may be served within the environment associated with the terminal node with which the terminal advertisement product definition corresponds. A combination of a terminal advertisement product definition and a terminal node provides a specific advertising opportunity, which corresponds with a specific location where an advertisement of the type matching the advertisement product definition may be served.

For instance, with reference to FIG. 3, the loan calculator terminal node 304 may correspond with a web page for a loan calculator. The loan calculator web page may allow for the presentation of button-type advertisements and banner-type advertisements within the web page. Accordingly, two specific advertising opportunities are associated with the loan calculator node 304: the first specific advertising opportunity represents the opportunity to present button-type advertisements on the loan calculator web page, and the second specific advertising opportunity represents the opportunity to present banner-type advertisements on the loan calculator web page.

A general advertising opportunity corresponds with each combination of an internal node and an advertisement product definition corresponding with the internal node. A general advertising opportunity associated with a given internal node represents an aggregation of all specific advertising opportunities related with terminal nodes beneath the corresponding internal node and of the same advertisement product definition.

For instance, with reference to FIG. 3, the mortgage internal node 316 is a parent node for the mortgage tips terminal node 302 and the loan calculator terminal node 304. The advertisement product definitions 324, 326, and 328 associated with the mortgage internal node 316 are based on the advertisement product definitions 320, 322, 330, and 332 from the associated terminal nodes 302 and 304. Accordingly, the general advertising opportunity associated with the combination of the mortgage internal node 316 and the banner advertisement product definition 326 represents an aggregation of: the specific advertising opportunity associated with the combination of the mortgage tips terminal node 302 and the banner advertisement product definition 332; and the specific advertising opportunity associated with the combination of the loan calculator terminal node 304 and the banner advertisement product definition 322. Likewise, the general advertising opportunity associated with the combination of the mortgage internal node 316 and the button advertisement product definition 324 corresponds with the specific advertising opportunity associated with the combination of the loan calculator terminal node 304 and the button advertisement product definition 320. Further, the general advertising opportunity associated with the combination of the mortgage internal node 316 and the skyscraper advertisement product definition 328 corresponds with the specific advertising opportunity associated with the combination of the mortgage tips terminal node 302 and the skyscraper advertisement product definition 330.

As indicated previously, each advertising opportunity corresponds with one or more locations for delivering an advertisement. More particularly, each specific advertising opportunity represents the opportunity to delivery an advertisement of a given advertisement product definition to a particular environment. For instance, in the context of web pages, a specific advertising opportunity corresponds with the opportunity to serve an advertisement of a given advertisement product definition on a particular web page. Each general advertising opportunity represents an aggregate of multiple specific advertising opportunities.

By allowing advertising opportunities to be aggregated in a directed graphs, such as the directed graph of FIG. 3, advertisers may purchase advertising opportunities at varying levels of specificity. In some cases, an advertiser may purchase a specific advertising opportunity associated with a terminal node and corresponding advertisement product definition. In such instances, the advertiser's advertisement may be served at the specific location associated with that specific advertising opportunity. For example, if an advertiser were to purchase the specific advertising opportunity associated with the banner advertisement product definition 322 and the loan calculator terminal node 304, the advertiser's banner advertisement may be displayed on the loan calculator web page associated with the loan calculator terminal node 304.

Additionally or alternatively, an advertiser may purchase a general advertising opportunity associated with an internal node. In such instances, the advertiser's advertisement may be served at any of the locations associated with the specific advertising opportunities associated with that general advertising opportunity. For example, if an advertiser were to purchase the advertising opportunity associated with the combination of the banner advertisement product definition 326 and the mortgage internal node 316, the advertiser's banner advertisement may be displayed on the mortgage tips web page associated with the mortgage tips terminal node 302 and/or on the loan calculator web page associated with the loan calculator terminal node 304. As a further example, if an advertiser were to purchase the general advertising opportunity associated with the banner advertisement product definition 334 and the home internal node 310, the advertiser's banner advertisement may be displayed on the real estate agents web page associated with the real estate agents web page 308, the mortgage tips web page associated with the mortgage tips terminal node 302, and/or on the loan calculator web page associated with the loan calculator terminal node 304

It should be noted that directed graphs in accordance with embodiments of the present invention allow nodes to have multiple parent nodes at any given level in the hierarchy. For instance, with reference to FIG. 3, the mortgage internal node 316 and the car loans internal node 318 are direct parent nodes of the loan calculator terminal node 304. This approach allows advertisements to be served to a given location based on advertisers purchasing advertising opportunities at any of a variety of different locations. For instance, an advertiser may purchase an advertising opportunity associated with the combination of the banner advertisement product definition 326 and the mortgage terminal node 316 or the advertising opportunity associated with the combination of the banner advertisement product definition 336 and the car loans internal node 318, and a banner advertisement for the advertiser may be served to the loan calculator web page associated with the loan calculator terminal node 304.

Although the directed graph of FIG. 3 illustrates a taxonomy in which each of the nodes is characterized based on the content of the environment in which advertisements may be served (i.e., web pages), in some embodiments, the taxonomy may be based on other types of classifications. For instance, in some embodiments, a taxonomy may be based on advertisement targeting information, such as geography, gender, age, and income. In such embodiments, locations for serving advertisements may be associated with advertisement targeting information. Accordingly, advertisements may be served to locations based on advertisers' desired targeting audience.

In some embodiments, multiple different types of classifications may be combined in a single directed graph. By way of illustration, FIG. 4 illustrates a directed graph that combines nodes characterized by content and nodes characterized by targeting information. In particular, the video game systems terminal node 402, the video games terminal node 404, and the action figures terminal node 406 are each characterized by the content of web pages associated with the nodes. The video gaming internal node 408, electronics internal node 410, and toys internal node 412 are also each characterized by content. However, the directed graph also contains internal nodes that are characterized based on targeting information. In particular, the Washington internal node 414 and Redmond internal node 416 correspond with geographic targeting information, and the ages 13-15 internal node 418 corresponds with age targeting information.

By incorporating nodes of multiple different classifications together in a single directed graph, advertisements may be served to a particular location by advertisers purchasing different advertising opportunities based on different criteria. For example, with reference to FIG. 4, suppose that a first advertiser wishes to have an advertisement related to video games served to a web page that relates to video gaming. The first advertiser may view the directed graph and decide to purchase an advertising opportunity associated with the video gaming internal node 408 and/or the video games terminal node 404. Based on this selection, the advertisement from the first advertiser may be served to a video games web page associated with the video games terminal node 404. Suppose that a second advertiser wishes to have an advertisement served to a web site that is likely to be visited by children ages 13-15. For example, the advertiser may have an advertisement that is generally directed to a toy store. Accordingly, the advertiser may wish to have the advertisement displayed on any web page corresponding with a certain age group, regardless of the specific content of that web page. The second advertiser may view the directed graph and chose to purchase an advertising opportunity associated with the Ages 13-15 internal node 418. Based on this selection, the second advertiser's advertisement may also be served to the web page associated with the video games terminal node 404.

As another example with continued reference to FIG. 4, an advertiser may wish to have an advertisement displayed on web sites that are likely to be viewed by users in a particular geographic region. For instance, the advertiser may own a physical store in the Redmond, Wash. area. Accordingly, the advertiser may wish to have the advertisement displayed on web pages that are likely to be viewed by users in the Redmond, Wash. area. By purchasing an advertising opportunity associated with the Redmond internal node 416, the advertiser may have the advertisement served at any locations associated with that general advertising opportunity.

In further embodiments of the present invention, a directed graph may be employed that allows for multiple, independent views of the directed graph. More particularly, a directed graph may be provided that classifies the relationships (i.e., edges) between nodes for the various views. This allows users to operate on a set of nodes in a distinct view while still impacting the same nodes and locations.

By way of illustration, FIG. 5 shows a directed graph similar to that shown in FIG. 3 but also including multiple edges between nodes that provide different views of the directed graph. Each view is defined by edges between nodes for the view. For example, the directed graph of FIG. 5 includes four different views. The view associated with the solid-line edges includes all nodes. The view associated with the dotted-line edges includes the nodes 502, 506, 508, and 514. The view associated with the dashed-line edges includes the nodes 504, 512, and 518. Finally, the view associated with the dashed/dotted-line edges includes the nodes 510 and 514.

Different views of a given directed graph may be employed in a variety of different manners within the scope of embodiments of the present invention. By way of example only and not limitation, in one embodiment, different views may be used for analysis purposes. For instance, different views may be used to recognize revenue at higher levels according to where advertisements are served. Alternate views can be expressed in multiple views when data is viewed for different purposes. In some cases, advertisements are organized in manners relevant to advertisers (e.g., type of content, demographics of target audience). The same information that is presented in this taxonomy can also be used for describing the non-advertising content of the surrounding environment (e.g., web pages). In the latter case, the taxonomy is not used for purchasing or selling advertisements, but as a tool to aid the understanding of the content hierarchy. Yet another view can reflect the origin of content, with divisions such as internal, external, joint partnership, various internal and external content groups, news organizations, editorial boards (which could exist within any of the above mentioned nodes), etc.

Figure 6:
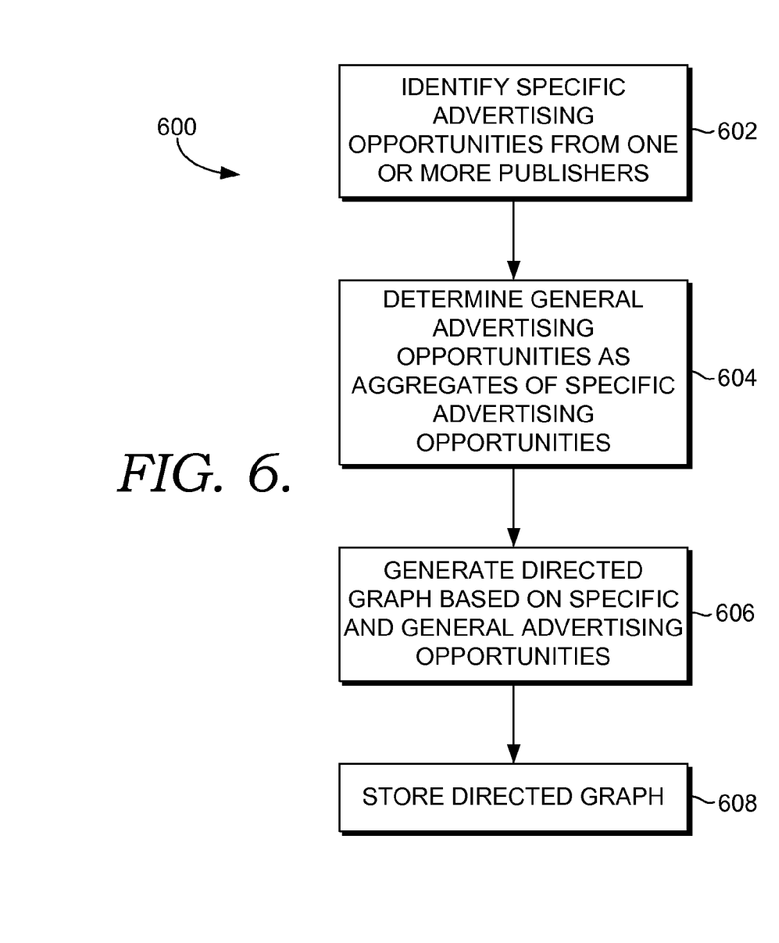
FIG. 6 is a flow diagram showing a method for generating a directed graph for use as an advertising system taxonomy in accordance with an embodiment of the present invention.

Turning to FIG. 6, a flow diagram is provided that shows a method 600 for generating a directed graph in accordance with an embodiment of the present invention. Initially, as shown at block 602, a number of specific advertising opportunities provided by one or more publishers are identified. The specific advertising opportunities correspond with specific locations for serving advertisements. The specific locations include both the environment in which an advertisement may be served (e.g., a web page, video game, ad-based software, and television programming) and the advertisement product definition(s) available for that environment.

As shown at block 604, general advertising opportunities are determined based on the specific advertising opportunities. More particularly, general advertising opportunities are determined by aggregating multiple sets of specific advertising opportunities. Varying levels of aggregations may be determined to provide any number of levels of general advertising opportunities. Additionally, multiple general advertising opportunities may have overlapping aggregations such that they may share common specific advertising opportunities.

A directed graph is generated based on the specific advertising opportunities and the general advertising opportunities, as shown at block 606. The directed graph is generated by representing each specific advertising opportunity as a combination of a terminal node (i.e., a node with no descendant nodes) within the directed graph representing the environment for that specific advertising opportunity and an advertisement product definition associated with the node. The directed graph is also generated by representing each general advertising opportunity as a combination of an internal node (i.e., a node with descendant nodes) within the directed graph and an advertisement product definition associated with the internal node. Edges are provided between the nodes to represent the relationships amongst the specific and general advertising opportunities.

The directed graph may be stored, as shown at block 608. For instance, an advertising service provider, such as the advertising service provider 204 of FIG. 2, may receive information from one or more publishers, such as the publisher 206 of FIG. 2, to generate the directed graph or receive information representing the directed graph, and stored the directed graph. As noted above, in some embodiments, a publisher may serve as an advertising service provider. In such embodiments, the publisher may generate and store the directed graph.

Figure 7:
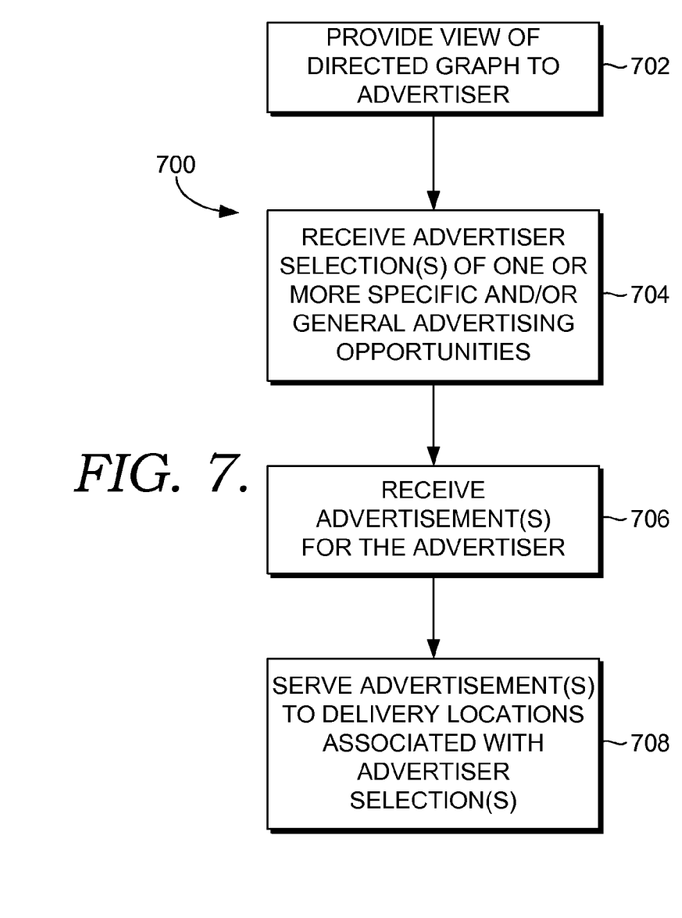
FIG. 7 is a flow diagram showing a method for using a directed graph as an advertising system taxonomy for serving advertisements from advertisers in accordance with an embodiment of the present invention.

Referring now to FIG. 7, a flow diagram is illustrated that shows a method 700 for using a directed graph as an advertising system taxonomy for serving advertisements in accordance with an embodiment of the present invention. Initially, as shown at block 702, a view of a directed graph is provided to an advertiser. For instance, an advertising service provider, such as the advertising service provider 204 of FIG. 2, may provide a view of a directed graph to an advertiser, such as the advertiser 202 of FIG. 2. As noted above, in some cases, a publisher, such as the publisher 206 of FIG. 2 may provide the functions of an advertising service provider and may provide the directed graph to the advertiser.

As described herein, the directed graph includes a variety of specific and general advertising opportunities. Accordingly, the advertiser may review the directed graph view and select one or more specific and/or general advertising opportunities, as represented at block 704. In some embodiments, the publisher and/or the advertising service provider may specify some advertising opportunities as being "for sale," while other advertising opportunities as not being "for sale." In such embodiments, only those advertising opportunities that have been designated as being "for sale" may be selected by the advertiser. By selecting one or more specific and/or general advertising opportunities, the advertiser may be "purchasing" the selected advertising opportunities. As noted above, this may include, for instance, the advertiser paying a certain amount to have an advertisement served to location(s) associated with the selections, when a presented advertisement is selected by a user, and/or when a user performs a conversion from the advertisement.

One or more advertisements for the advertiser may be received, as shown at block 706. The advertisements may be received from the advertiser or may be received from a third party, such as an advertising agency providing advertisements for the advertiser. In some embodiments, the advertising service provider may generate the advertisements for the advertiser. Any and all such variations are contemplated to be within the scope of embodiments of the present invention.

As shown at block 708, based on the advertiser selections, one or more advertisements from the advertiser are delivered to at least one location associated with the selected advertising opportunity or opportunities. In the case of a specific advertising opportunity being selected, there is only one specific location for delivering the advertisement(s), and the advertisement may be delivered to that specific location. In the case of a general advertising opportunity, there may be multiple specific locations for delivering the advertisement(s), and the advertisement may be delivery any or all of the specific locations.

As can be understood, embodiments of the present invention provide an approach for using a directed graph as an advertising system taxonomy for serving advertisements. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A method for generating a directed graph as an advertising system taxonomy, the method comprising:
   identifying a plurality of specific advertising opportunities from one or more publishers, each specific advertising opportunity from the plurality of specific advertising opportunities comprising a specific location for serving an advertisement, each specific location being defined by an environment for serving an advertisement and an advertisement product definition that defines advertisement parameters supported by the environment, wherein only advertisements that meet the advertisement parameters are able to be displayed within the environment;
   determining a plurality of general advertising opportunities, each general advertising opportunity from the plurality of specific advertising opportunities representing an aggregate of one or more specific advertising opportunities from the plurality of specific advertising opportunities, wherein at least two general advertising opportunities each include a common specific advertising opportunity;
   generating, by a first computing process, a directed graph based on the plurality of specific advertising opportunities and the plurality of general advertising opportunities, the directed graph including a plurality of terminal nodes having no descendent nodes, a plurality of internal nodes having descendant nodes, and a plurality of advertisement product definitions associated with the terminal nodes and the internal nodes, wherein each specific advertising opportunity from the plurality of specific advertising opportunities is represented in the directed graph by a unique combination of a terminal node and an associated advertisement product definition, and wherein each general advertising opportunity from the plurality of general advertising opportunities is represented in the directed graph by a unique combination of an internal node and an associated advertisement product definition; and
   storing, by a second computing process, the directed graph in one or more computer storage media;
   wherein the first and second computing processes are performed by one or more computing devices.

2. The method of claim 1, wherein an environment for serving an advertisement comprises one or more of the following: a web page, a video game, an ad-based software, and television programming.

3. The method of claim 1, wherein an environment for serving an advertisement comprises a web page, and wherein an advertisement product definition comprises a banner, a button, or a skyscraper.

4. The method of claim 1, wherein the method further comprises:
   providing the directed graph to an advertiser; and
   receiving an advertiser selection of one or more specific advertising opportunities and general advertising opportunities from the directed graph.

5. The method of claim 4, wherein the method further comprises facilitating the delivery of an advertisement of the advertiser to one or more specific locations associated with the one or more specific advertising opportunities and general advertising opportunities.

6. The method of claim 1, wherein the method further comprises generating two or more independent views of the directed graph by providing multiple sets of edges between nodes in the directed graph, each set of edges defining an independent view of the directed graph.

7. The method of claim 1, wherein each terminal node is characterized in the directed graph based on content of the environment for serving an advertisement associated with the terminal node.

8. The method of claim 7, wherein each of at least a portion of the internal nodes is characterized based on content associated with corresponding terminal nodes.

9. The method of claim 8, wherein each of at least a second portion of the internal nodes is characterized by advertising targeting information.

* * * * *